US007261366B2

United States Patent
Garceau

(10) Patent No.: US 7,261,366 B2
(45) Date of Patent: Aug. 28, 2007

(54) ROOF BOW

(75) Inventor: Bernard F. Garceau, Granger, IN (US)

(73) Assignee: Norco Industries, Inc., Compton, CA (US)

( * ) Notice: Subject to any disclaimer, the term of this patent is extended or adjusted under 35 U.S.C. 154(b) by 0 days.

(21) Appl. No.: 11/328,716

(22) Filed: Jan. 10, 2006

(65) Prior Publication Data

US 2007/0029843 A1 Feb. 8, 2007

Related U.S. Application Data

(63) Continuation of application No. 10/729,601, filed on Dec. 5, 2003, now Pat. No. 6,983,984.

(60) Provisional application No. 60/441,894, filed on Jan. 21, 2003.

(51) Int. Cl.
*B62D 25/06* (2006.01)
(52) U.S. Cl. .................................... 296/210
(58) Field of Classification Search ............... 296/210, 296/185.1, 178, 98, 104–105, 109, 111–115, 296/118, 100.11–100.14, 100.17–100.18; 52/46; 105/397, 404
See application file for complete search history.

(56) References Cited

U.S. PATENT DOCUMENTS 3,700,277 A * 10/1972 Montean, Jr. ............... 296/104
6,502,895 B2 * 1/2003 Taylor ......................... 296/178

* cited by examiner

*Primary Examiner*—H Gutman
(74) *Attorney, Agent, or Firm*—Hahn Loeser & Parks, LLP; W. Edward Crooks

(57) ABSTRACT

A roof bow for a vehicle, comprising a vertical face, a curved top flange extending in a first direction, and a straight bottom flange extending in the first direction. Preferably, the roof bow is monolithic with a plurality of apertures in the vertical face that provide clearance for ductwork, wiring, etc. Additionally, the roof bow may comprise horizontally and vertically-extending indented embossments, and rolled embossments about the apertures. Side flanges may additionally extend in the first direction and attach to side walls of the vehicle via an angled connector.

20 Claims, 9 Drawing Sheets

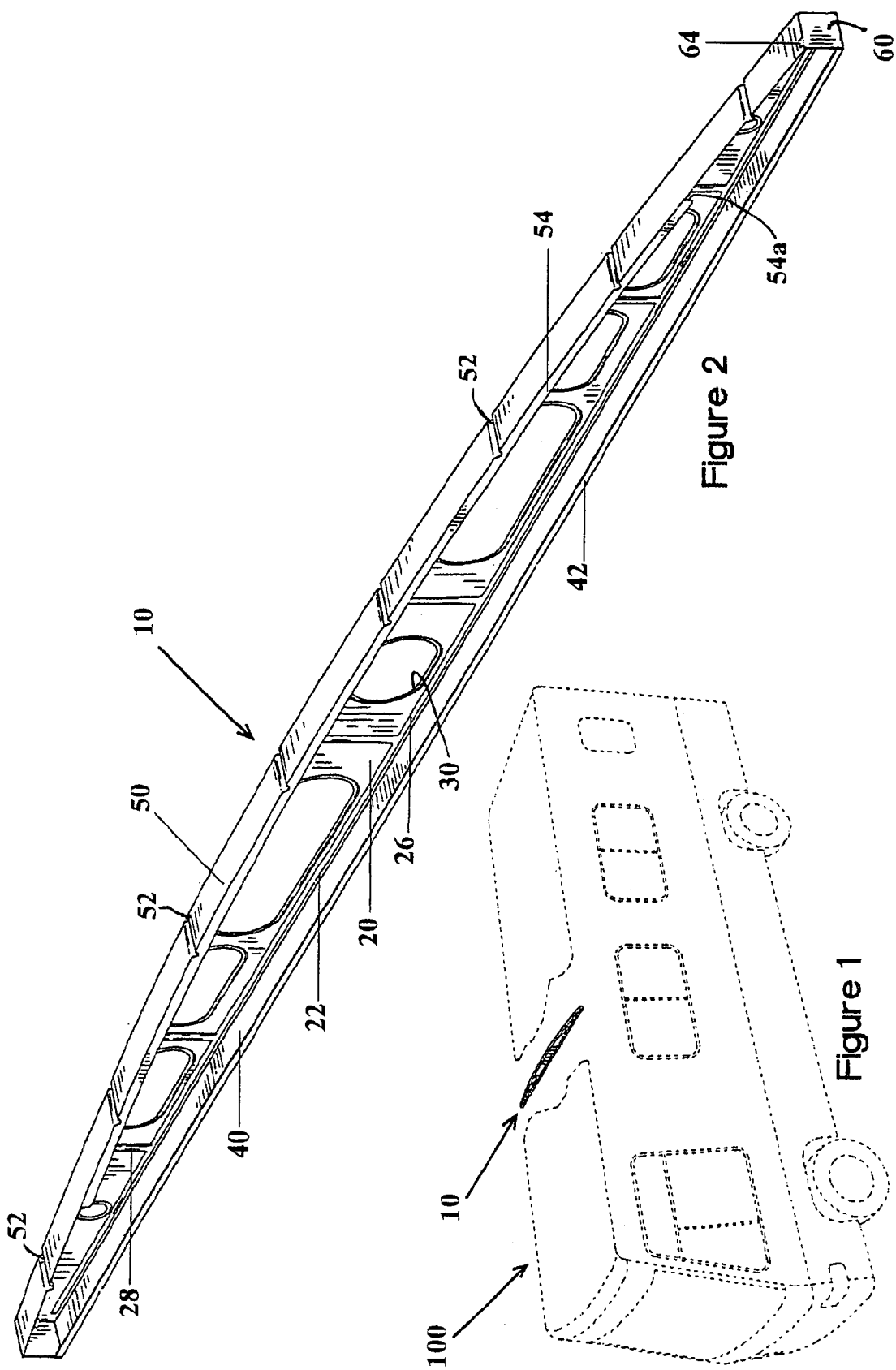

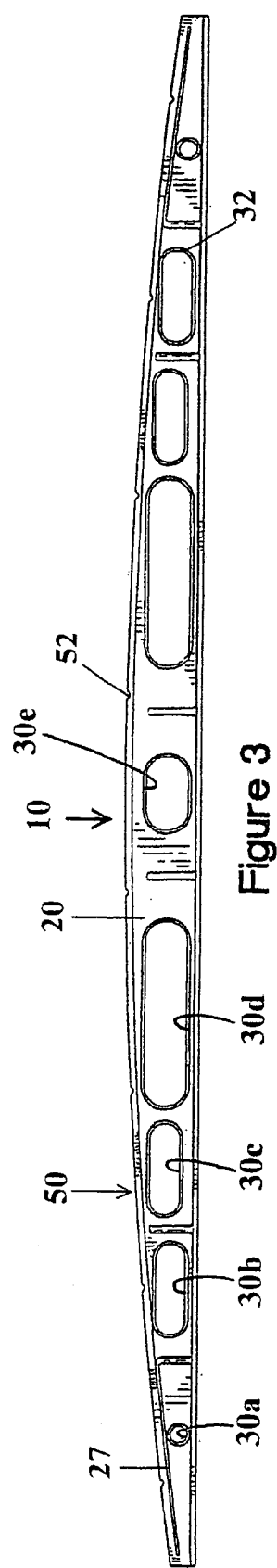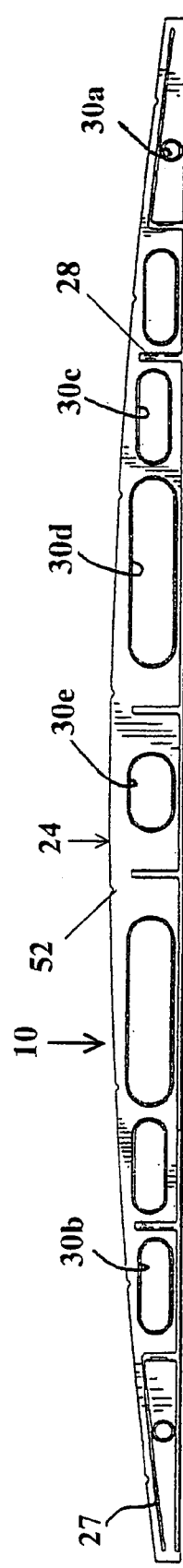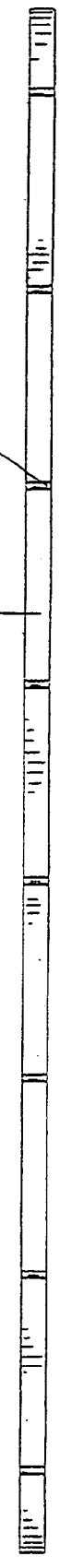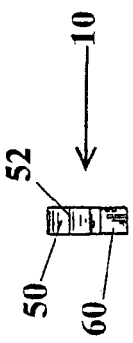
Figure 3
Figure 4
Figure 5
Figure 6
Figure 7

US 7,261,366 B2

ROOF BOW

CROSS REFERENCE TO RELATED APPLICATIONS

This application is a continuation of application Ser. No. 10/729,601, filed Dec. 5, 2003, now U.S. Pat. No. 6,983,984, which claims priority from U.S. Provisional Application No. 60/441,894 filed Jan. 21, 2003, all of which are incorporated herein by reference.

BACKGROUND OF THE INVENTION

This invention relates generally to roof supports for recreational vehicles, trailers, utility trailers, utility vehicles, such as United Parcel Service trucks, buses, horse trailers, semi-trailers and other similar vehicles, including single axle, double axle and multi-axle vehicles and more particularly to a curved roof bow for use with such vehicles.

SUMMARY OF THE INVENTION

In one aspect of the present invention, this is accomplished by providing a curved roof bow comprising: an elongate member having: a vertical face, the vertical face having a horizontally straight lower edge and a curved or arched upper edge, a bottom flange extending in a first direction from the lower edge of the vertical face, and a top flange extending in the first direction from the curved upper edge of the vertical face. Preferably, the curved roof bow is monolithic.

The foregoing and other aspects will become apparent from the following detailed description of the invention when considered in conjunction with the accompanying drawing figures.

BRIEF DESCRIPTION OF THE DRAWING FIGURES

FIG. 1 is a perspective view of a roof bow of the present invention showing the curved roof bow installed in a recreational vehicle.

FIG. 2 is a perspective view of a first embodiment of a roof bow, in accordance with a preferred embodiment of the present invention.

FIG. 3 is a front view of the roof bow illustrated in FIG. 2.

FIG. 4 is a rear view of the roof bow illustrated in FIG. 2.

FIG. 5 is a top view of the roof bow illustrated in FIG. 2.

FIG. 6 is a bottom view of the roof bow illustrated in FIG. 2.

FIG. 7 is a side elevational view of the roof bow illustrated in FIG. 2, the other side being a mirror image thereof.

DETAILED DESCRIPTION

Figure 8:
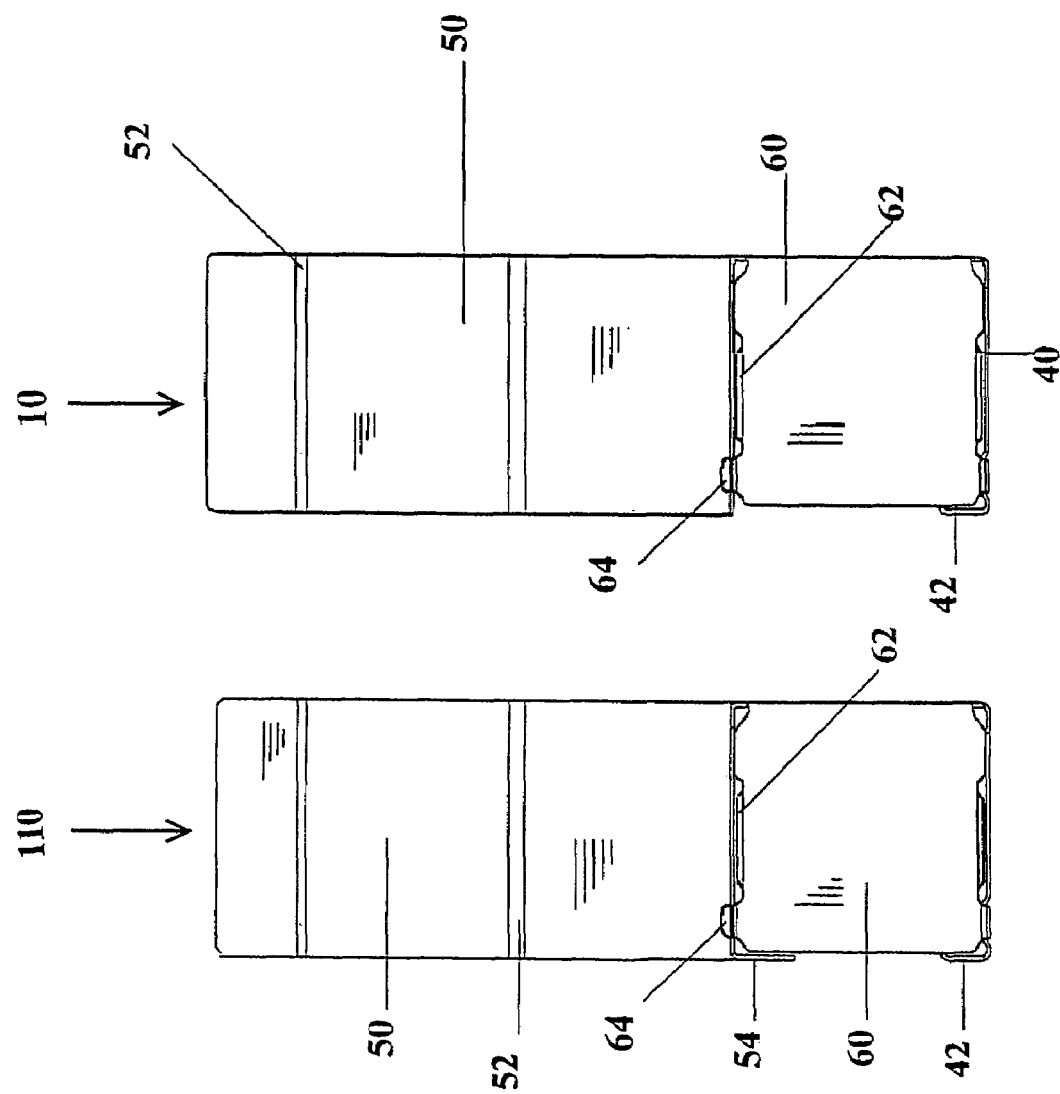
FIG. 8a is a side elevational view of a second embodiment of a roof bow, wherein the downward flange extends the entire length of the top flange.
FIG. 8b is a side view of the roof bow illustrated in FIG. 2, wherein a portion of the downward flange is removed.

The FIGURES illustrate a curved roof bow 10 for use with recreational vehicles, trailers, utility trailers, utility vehicles, such as United Parcel Service trucks, buses, horse trailers, semi-trailers and other similar vehicles (collectively, "vehicles"), including single axle, double axles and multi-axles vehicles.

A preferred embodiment of a curved roof bow 10 is illustrated in FIGS. 2-9. Curved roof bow 10 comprises a horizontally-extending beam having a vertical face 20, a vertical face lower edge 22, a vertical face upper edge 24, a bottom flange 40 extending in a first direction, and a top flange 50 extending in the first direction. The vertical face 20 preferably includes a plurality of apertures 30 of predetermined shapes and sizes. As is illustrated in FIG. 3, the vertical face lower edge 22, and thus bottom flange 40, are substantially straight. The bottom flange 40 and top flange 50 preferably extend substantially the entire width, or longitudinal extent, of the curved roof bow 10. The vertical face upper edge 24, and thus top flange 50, preferably has a non-planar, non-linear, or other curved or discontinuous shape, such that the top flange does not lie in a single plane. In a preferred embodiment, the vertical face upper edge 24, and thus top flange 50 is arched or curved, as is illustrated in FIGS. 3-4. However, it is also contemplated that the vertical face upper edge 24, and thus top flange 50, may have any of a plurality of other non-planar shapes such as stepped, or a combination of angled end portions and straight middle portions.

Preferably, the curved roof bow 10 is monolithic, i.e., formed and bent from a single sheet of metal. However, it is also contemplated that the roof bow 10 may be formed by securing two or more sections together to form a finished product. Additionally, it is contemplated that other gauges of steel and other materials can be utilized without deviating from the scope of the present invention. For example, the roof bow 10 may be comprised of aluminum, other thin gauge metals, or any of a plurality of other materials that can be formed in a die or molded. The curved roof bow 10 may optionally be protected from corrosion by galvanization, painting or other corrosion protection means.

Figure 10:
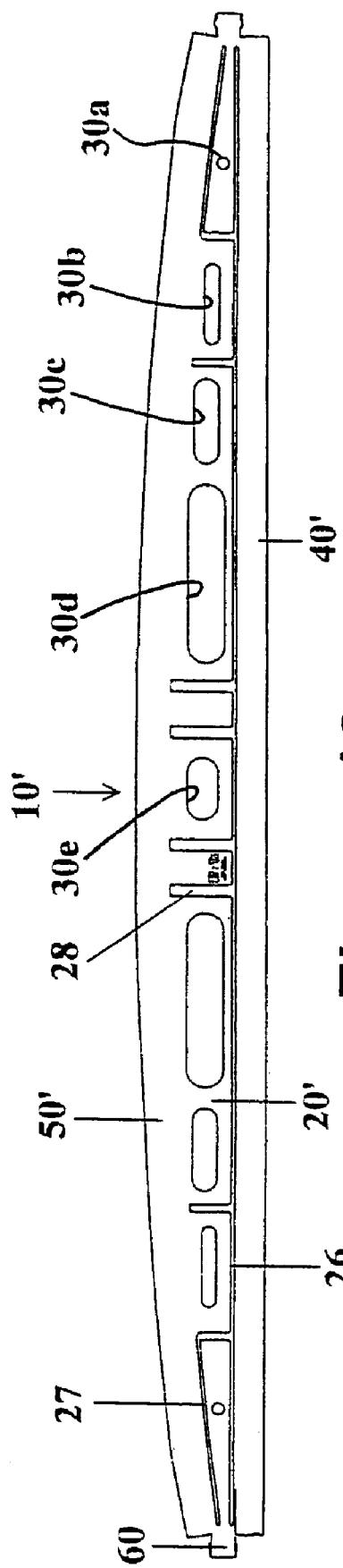
FIG. 10 is a top plan view of a preferred embodiment of a roof bow blank.
Figure 11:
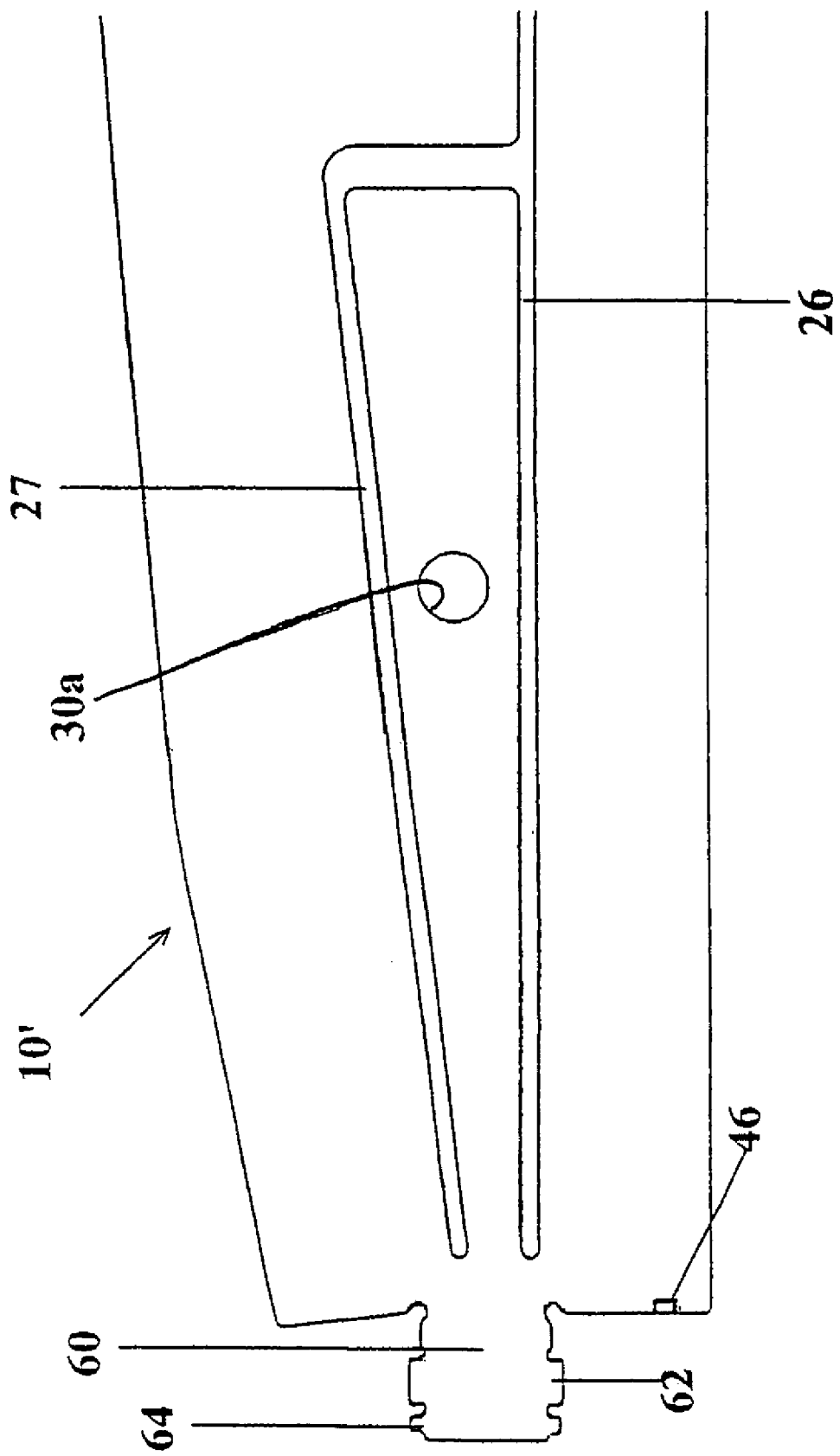
FIG. 11 is an enlarged top plan view of an end of the roof bow blank illustrated in FIG. 10.
Figure 12:
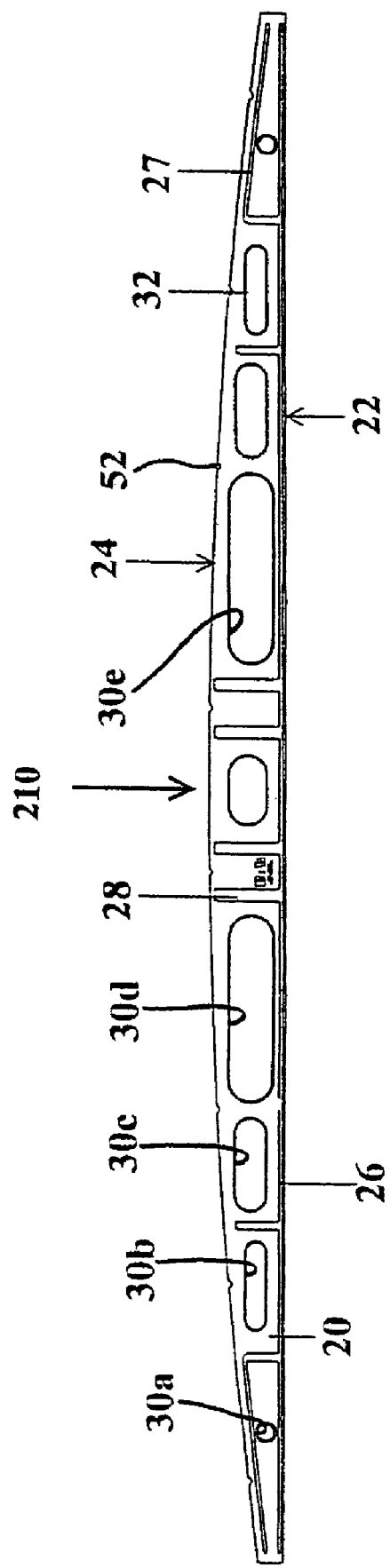
FIG. 12 is a rear view of a third embodiment of a roof bow, the roof bow having two vertical embossments on each side of the central aperture.

FIGS. 10-11 illustrate a preferred embodiment of the sheet metal blank 10' of a curved roof bow 10. The sheet metal blank 10' is advantageous as a starting material if the user desires a monolithic roof bow formed by bending. The sheet metal blank 10' preferably includes at least one horizontal embossment 26, which gives the blank 10' sufficient stiffness during the manufacturing process. Additionally, a plurality of vertical embossments 28 may be are provided in the vertical face 20, along with one or more additional horizontal embossments 27.

A plurality of apertures 30 may be formed in the vertical face 20 of the curved roof bow 10. These apertures 30 may be provided as clearance holes for marker lights, wiring, ducting, or stay lasts or stiffeners (such as a wood 2×4 to space one curved roof bow from an adjacent roof bow, usually on 16" centers). Preferably, the round apertures 30a on the outboard end of the curved roof provide clearance for marker lights when the curved roof bow is installed at the rear of the vehicle. The oval apertures 30b next inboard from the round apertures may be used for the stay lasts. The oval apertures 30c next to the stay lasts apertures 30b may be are usually used for wiring. The large apertures 30d are typically used for ducting, and the center aperture 30e is typically used for wiring and, when installed at the rear of the vehicle, as clearance for a marker light. It should be understood that the aforementioned reference to particular apertures 30a-30e in conjunction with particular functions is exemplary; the number and shape of apertures 30 and the function of any particular aperture can be adapted for particular needs of the vehicle 100 without deviating from the scope of the present invention.

Figure 9:
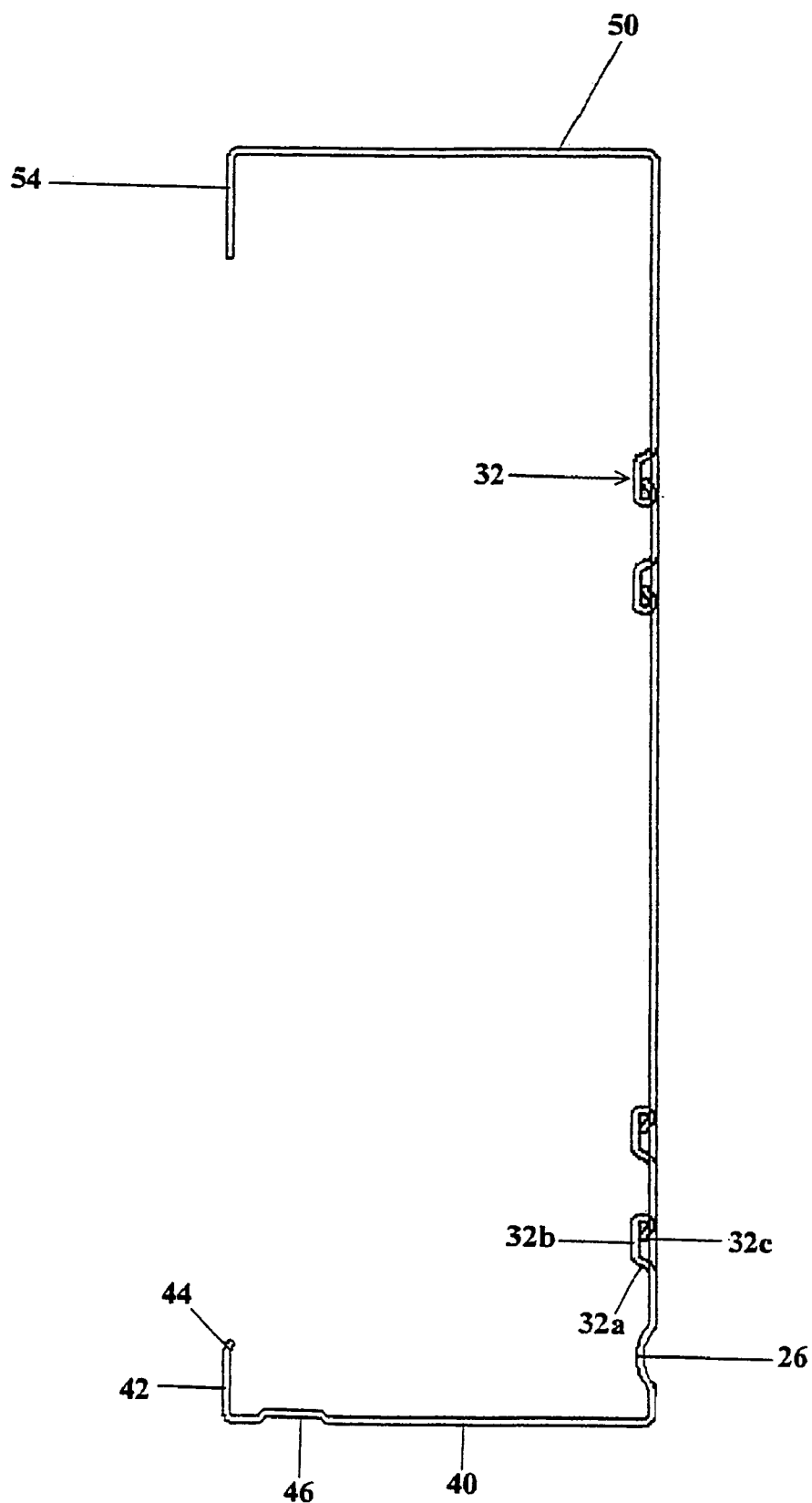
FIG. 9 is a side schematic view of a roof bow, illustrated without the end caps.

One or more of the apertures 30 may have rolled edges or other embossments to provide a smoother perimeter edge rather than a sharp edge. Such a smooth edge is advantageous when wiring or other material is pulled through the apertures 30. In a preferred embodiment, one or more of the apertures 30a-30e have embossments 32 as shown in FIG. 9. The first section 32a of the embossment extends away from the vertical face 20 at an angle. Preferably, the first section 32a extends at an angle forwardly and inwardly, i.e., toward the center of the aperture 30. The second section 32b of the embossment extends vertically from the first section 32a, and thus is parallel to the vertical face 20. The third section 32c of the embossment rolls rearwardly, thus eliminating sharp edges about the aperture perimeter. This particular type of rolled embossment provides additional stiffness to the curved roof bow and presents a smooth edge to prevent damage to any wires passing through the apertures.

Further embodiments for the rolled embossments providing a smooth aperture edge are contemplated, and may be utilized without deviating from the scope of the present invention. For example, the third section may roll forwardly, or the first section 32a and/or second section 32b could be eliminated entirely, with simply the perimeter of the aperture simply being at least slightly rolled in either direction. It is also contemplated that the embossments about the apertures can be eliminated entirely.

The bottom flange 40 and the top flange 50 of the curved roof bow 10 preferably extend in the same direction. More preferably, both the bottom flange 40 and the top flange 50 extend forwardly (i.e. toward the front of the vehicle 100) perpendicular to the vertical face 20. However, it is also contemplated that both the bottom flange 40 and the top flange 50 extend rearwardly, or that the that flanges 40 and 50 extend in opposite directions, or both flanges 40 and 50 extend in both directions, similar to an I-beam.

Figure 13:
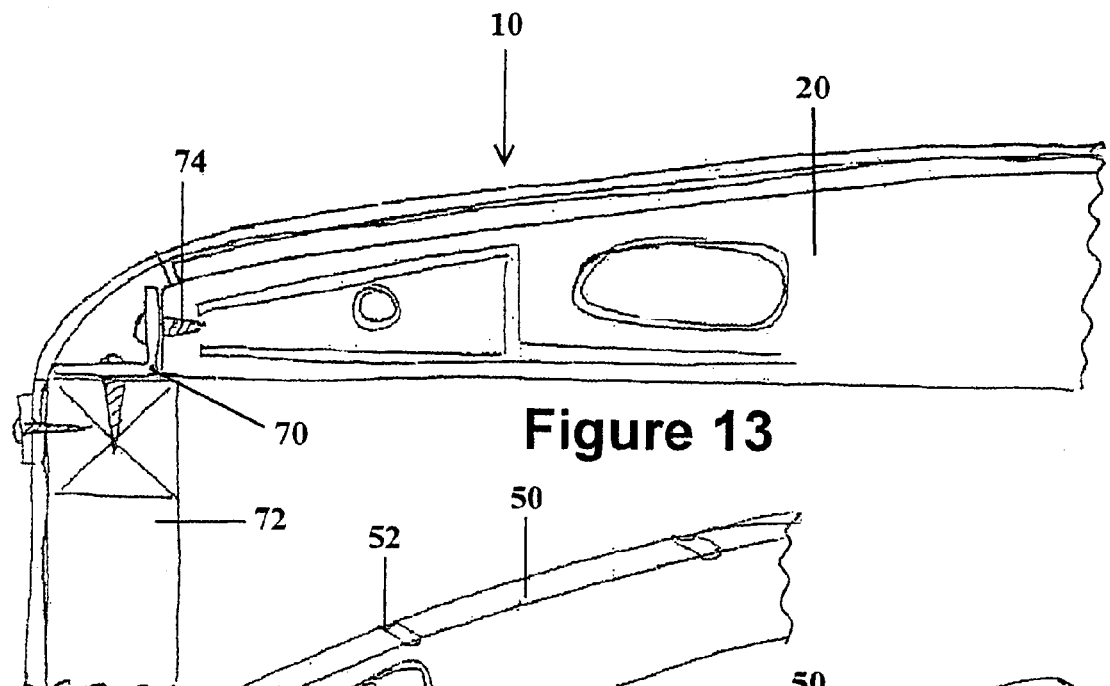
FIG. 13 illustrates a front schematic view of a side of a roof bow attached to a side wall of a vehicle by an angled connector and fasteners.

To form the curved roof bow 10 from the a sheet metal blank 10', such as the sheet metal blank 10' illustrated in FIG. 10, the lower portion 40' of the sheet metal blank 10' is bent about 90°, forming a bottom straight flange 40. The exposed edge of the bottom flange is bent upward about 90°, as shown in FIG. 13, forming an upward flange 42. The upper part 44 of the upward flange 42 of the bottom flange 40 is then bent approximately 45° inward towards the vertical face 20, as shown in FIG. 13. The upper portion 50' of the sheet metal blank is bent about 90° in the same direction as the bottom flange. The edge of the upper flange is bent downward about 90°, forming downward flange 54, as shown in FIG. 2.

In a preferred embodiment, one or more indented or pleated embossments 52 are formed in the upper flange, as seen in FIGS. 2, 3, and 4. The indented embossments 52 are formed to shorten the length of take up excess material in the top flange 50 upon bending the sheet metal blank 10', which prevents the top flange 50 from buckling or wrinkling during the bending process. Additionally, the indented embossments 52 help stiffen the roof bow 10. The size, number, and orientation of indented embossments 52 can be altered without deviating from the scope of the present invention. For example, the top flange 50 may comprise a single indented embossment (not shown) that extends longitudinally across the top flange 50.

In a preferred embodiment, the indented embossments 52 illustrated in FIGS. 2, 3, and 4 preferably may have a 3/16" radius and may be 3/16" deep. Additionally, the curved roof bow is preferably 94" long when used for an 8' recreational vehicle and has a 368 5/8" radius of curvature. As such, the first top flange indented embossment 52 from the left edge of the curved roof bow is preferably 5" from the left edge, and the remaining top flange indented embossments 52 are 12" from the preceding embossment, resulting in the rightmost embossment 52 being 5" from the right edge of the curved roof bow. It should be understood that the precise shape, size, and location of the indented embossments 52 illustrated is exemplary only. For example, the indented embossments can be v-shaped, convex, concave, convoluted, or any of a plurality of other shapes. As such, "indented" is meant to include all examples mentioned above, and any other similar configurations known in the art. Additionally, the size and location of the indented embossments 52 can be altered without deviating from the scope of the present invention.

As will be appreciated from one of ordinary skill in the art, with curved roof bows 10 of different sizes and radii of curvature, the number and size of indented embossments 52 may vary. For example, with curved roof bows 10 that have a greater radius of curvature than the example specified above, the number or size of embossments 52 may be increased. Similarly, for curved roof bows 10 that have a lesser radius of curvature, the size or number of embossments 52 may be decreased. Additionally, if all or a portion of the top flange is straight rather than curved or arched, the indented embossments 52 may be reduced or eliminated entirely.

As can be seen in FIGS 8a-8b, the sides of the vertical face 20 comprise end caps or side flanges 60. The end caps 60 preferably extend in the same direction as the top flange 50 and the bottom flange 40. In a preferred embodiment, the end caps 60 are rectangular. However, it is contemplated that end caps 60 may be any of a plurality of shapes without deviating from the scope of the present invention.

The end caps 60 of the curved roof bow 10 preferably have small tabs 62, 64 extending from the top and bottom edges of the end caps 60, shown at the ends of the sheet metal blank 10' shown in FIG. 10. These small tabs 62, 64 are bent approximately 90° to the end caps 60, as shown in FIGS. 8a-8b. Preferably, these small tabs 62, 64 are not attached to the top and bottom flanges 40 and 50. However, it is contemplated that the small tabs 62, 64 and/or other portions of the end caps 60 may optionally be attached to the top flange 50 and/or the bottom flange 40. The small tabs 62, 64 and end caps 60 help prevent compression of the ends of the curved roof bow under vertical loads, by providing support for the ends of the top flange 50 and bottom flange 40.

To provide enhanced support for the bottom flange 40 and the top flange 50, the tabs 62 and 64 on each end of end cap 60 may be located on opposing sides of both the bottom flange 40 and top flange 50, respectively, as seen in FIGS. 8*a*-8*b*. To provide a smooth bottom surface of curved roof bow 10, notch 46, as illustrated in FIGS. 9 and 11, may be formed into bottom flange 40, such that tab 64, when bent from end cap 60, does not extend below bottom flange 40, as illustrated in FIGS. 8*a*-8*b*.

A portion 54A of downward flange 54 at the ends of the curved roof bow is preferably cut-away, as shown in FIG. 2, to provide for clearance during the various manufacturing processes. However, as illustrated in FIG. 8*a*, it is also contemplated that downward flange 54 may be continuous across the entire length of top flange 50. It is also contemplated that downward flange 54 may be eliminated entirely.

Figure 14:
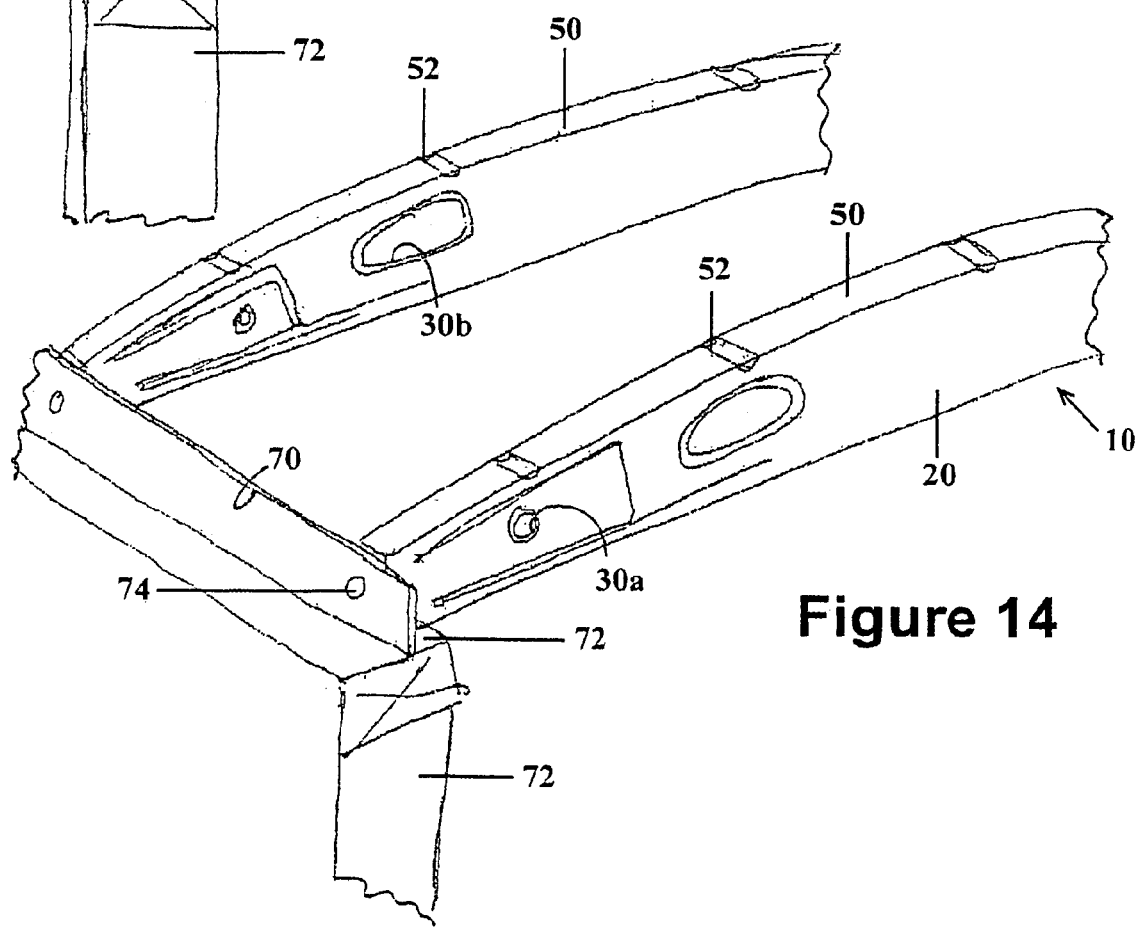
FIG. 14 illustrates a perspective schematic view of two roof bows attached to a side wall of a vehicle by an angled connector and fasteners.

FIGS. 13 and 14 illustrate the installation of the curved roof bow 10 in a recreational vehicle 100. An angled connector 70 is attached to the top of the vehicle side walls 72. Two angled connectors 70 are preferably used for each curved roof bow 10. The curved roof bow 10 is then connected at each end to an angled connector 70 via screws, bolts, or any of a plurality of fasteners 74 or fastening means known in the art. Preferably, the ends of the curved roof bow 10 rest on the tops of the vehicle side walls 72 when attached.

Figure 15:
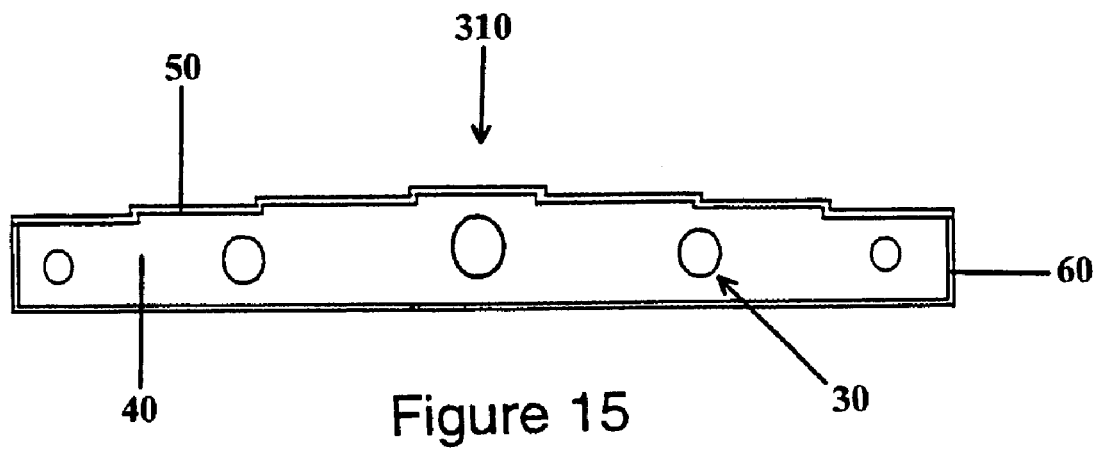
FIG. 15 illustrates a schematic top plan view of a fourth embodiment of a roof bow.
Figure 16:
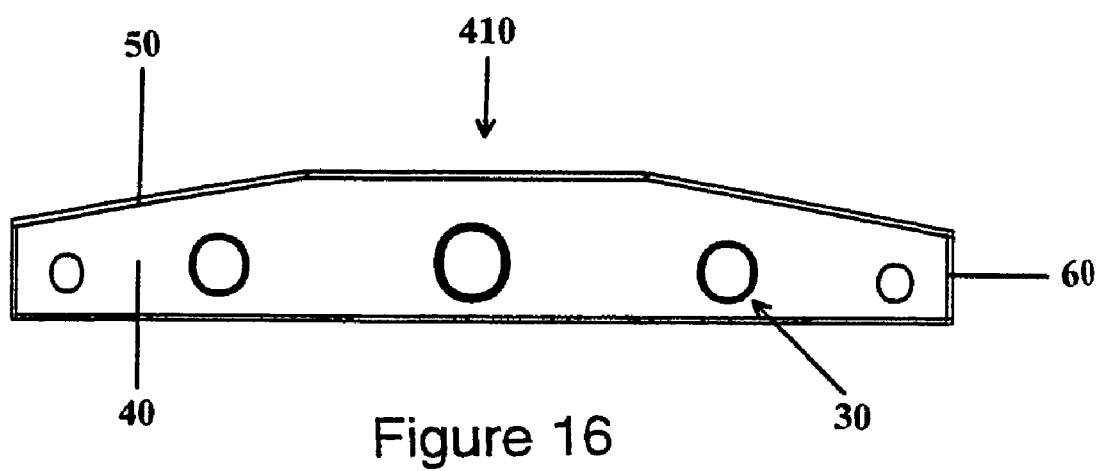
FIG. 16 illustrates a schematic top plan view of a fifth embodiment of a roof bow.

FIGS. 15 and 16 illustrate further contemplated embodiments of a roof bow 310, 410. As can be seen in FIG. 15, the roof bow 310 may comprise a vertical face 40, and thus top or upper flange 50 that is stepped, with the incremental vertical sections of the flange 50 functioning to gather material, in a similar manner as indented embossments 52. Furthermore, as illustrated in FIG. 16, the roof bow 410 may comprise a top flange 50 that comprises two angled portions and a horizontal portion. In this embodiment, indented embossments may be formed at the junctions between the angled and horizontal portions, or excess material may be removed at the same junctions prior to forming the upper flange 50.

The forgoing disclosure is illustrative of the present invention and is not to be construed as limiting thereof. Although one or more embodiments of the invention have been described, persons of ordinary skill in the art will readily appreciate that numerous modifications could be made without departing from the scope and spirit of the disclosed invention. As such, it should be understood that all such modifications are intended to be included within the scope of this invention. The written description and drawings illustrate the present invention and are not to be construed as limited to the specific embodiments disclosed.

What is claimed is:

1. A longitudinally-extending roof bow comprising:
 a horizontally-straight lower flange;
 a continuously curved upper flange;
 a vertically-extending web at least partially extending between the lower flange and the upper flange; wherein,
 the web includes a plurality of apertures therein.

2. The roof bow as recited in claim 1, further comprising an end cap on each end of the roof bow, each end cap being substantially perpendicular to the lower flange.

3. The roof bow as recited in claim 2, wherein each end cap extends from the web.

4. The roof bow as recited in claim 1, wherein the upper flange and the lower flange extend substantially perpendicularly to the web.

5. The roof bow as recited in claim 1, wherein the upper flange comprises at least one embossment.

6. The roof bow as recited in claim 1, wherein the web includes a plurality of embossments therein.

7. The roof bow as recited in claim 6, wherein perimeters of the apertures in the web are at least partially rolled.

8. The roof bow as recited in claim 1, wherein the roof bow is monolithic.

9. The roof bow as recited in claim 1, wherein the upper flange has a uniform radius of curvature.

10. A longitudinally-extending roof bow comprising:
 a horizontally-straight lower flange;
 a curved upper flange having at least one embossment;
 a vertically-extending web at least partially extending between the lower flange and the upper flange; wherein,
 the web includes a plurality of apertures therein.

11. The roof bow as recited in claim 10, further comprising an end cap on each end of the roof bow, each end cap being substantially perpendicular to the lower flange.

12. The roof bow as recited in claim 10, wherein the upper flange and the lower flange extend substantially perpendicularly to the web.

13. The roof bow as recited in claim 10, wherein the web includes a plurality of embossments therein.

14. The roof bow as recited in claim 10, wherein perimeters of the apertures in the web are at least partially rolled.

15. The roof bow as recited in claim 10, wherein the roof bow is monolithic.

16. The roof bow as recited in claim 10, wherein the upper flange has a uniform radius of curvature.

17. A longitudinally-extending roof bow comprising:
 a horizontally-straight lower flange;
 a curved upper flange;
 a vertically-extending web at least partially extending between the lower flange and the upper flange, the web including a plurality of apertures therethrough and a plurality of embossments therein.

18. The roof bow as recited in claim 17, further comprising an end cap on each end of the roof bow, each end cap being substantially perpendicular to the lower flange.

19. The roof bow as recited in claim 17, wherein perimeters of the apertures in the web are at least partially rolled.

20. The roof bow as recited in claim 17, wherein the roof bow is monolithic.

* * * * *